US012675864B2

(12) United States Patent
Xu et al.

(10) Patent No.: US 12,675,864 B2
(45) Date of Patent: Jul. 7, 2026

(54) POINT CLOUD QUALITY EVALUATION METHOD, AND DEVICE AND STORAGE MEDIUM

(71) Applicants: ZTE CORPORATION, Shenzhen (CN); SHANGHAI JIAO TONG UNIVERSITY, Shanghai (CN)

(72) Inventors: Yiling Xu, Shenzhen (CN); Qi Yang, Shenzhen (CN); Yujie Zhang, Shenzhen (CN); Yunfeng Guan, Shenzhen (CN); Jun Sun, Shenzhen (CN); Zhao Wu, Shenzhen (CN); Ying Gao, Shenzhen (CN); Ping Wu, Shenzhen (CN)

(73) Assignees: ZTE CORPORATION, Shanghai (CN); SHANGHAI JIAO TONG UNIVERSITY, Shanghai (CN)

( * ) Notice: Subject to any disclaimer, the term of this patent is extended or adjusted under 35 U.S.C. 154(b) by 258 days.

(21) Appl. No.: 18/713,367

(22) PCT Filed: Nov. 25, 2022

(86) PCT No.: PCT/CN2022/134212
§ 371 (c)(1),
(2) Date: May 24, 2024

(87) PCT Pub. No.: WO2023/093824
PCT Pub. Date: Jun. 1, 2023

(65) Prior Publication Data
US 2025/0014162 A1    Jan. 9, 2025

(30) Foreign Application Priority Data

Nov. 26, 2021    (CN) .......................... 202111424084.8

(51) Int. Cl.
*G06T 7/00* (2017.01)
*G06T 5/20* (2006.01)
(Continued)

(52) U.S. Cl.
CPC .............. *G06T 7/0002* (2013.01); *G06T 5/20* (2013.01); *G06T 7/60* (2013.01); *G06T 19/20* (2013.01);
(Continued)

(58) Field of Classification Search
CPC .......... G06T 7/0002; G06T 5/20; G06T 7/60; G06T 19/20; G06T 2207/10028;
(Continued)

(56) References Cited

U.S. PATENT DOCUMENTS

2019/0080503 A1    3/2019  Bhowmick et al.
2023/0011921 A1*   1/2023  Iwami ................... G01S 7/4802
(Continued)

FOREIGN PATENT DOCUMENTS

CN    110533645 A    12/2019
CN    112637594 A    4/2021
CN    112802071 A    5/2021

OTHER PUBLICATIONS

Xu et al., "EPES: Point Cloud Quality Modeling Using Elastic Potential Energy Similarity", IEEE, Published Sep. 29, 2021 ( Year: 2021).*

(Continued)

*Primary Examiner* — Aaron W Carter
(74) *Attorney, Agent, or Firm* — Morgan, Lewis & Bockius LLP

(57)    ABSTRACT

Provided are a point cloud quality evaluation method and device and a storage medium. The method includes: selecting the target number of reference point cloud regions from a reference point cloud according to a preset region selection
(Continued)

Select the target number of reference point cloud regions from a reference point cloud according to a preset region selection rule — S110

Select to-be-evaluated point cloud regions respectively corresponding to the target number of reference point cloud regions from a to-be-evaluated point cloud corresponding to the reference point cloud — S120

Perform at least one scale transformation on each reference point cloud region and a respective to-be-evaluated point cloud region successively to generate corresponding new reference point cloud regions and corresponding new to-be-evaluated point cloud regions — S130

Perform a quality evaluation on each new reference point cloud region and a respective new to-be-evaluated point cloud region separately to obtain a corresponding quality evaluation value — S140

Fuse all quality evaluation values to obtain a corresponding multi-scale quality evaluation value — S150 rule (S110); selecting to-be-evaluated point cloud regions respectively corresponding to the target number of reference point cloud regions from a to-be-evaluated point cloud corresponding to the reference point cloud (S120); successively performing at least one scale transformation on the reference point cloud region and a respective to-be-evaluated point cloud region to generate corresponding new reference point cloud regions and corresponding new to-be-evaluated point cloud regions (S130); separately performing a quality evaluation on each new reference point cloud region and a respective new to-be-evaluated point cloud region to obtain a corresponding quality evaluation value (S140); and fusing all quality evaluation values to obtain a corresponding multi-scale quality evaluation value (S150).

17 Claims, 5 Drawing Sheets

(51) Int. Cl.
  *G06T 7/60* (2017.01)
  *G06T 19/20* (2011.01)
(52) U.S. Cl.
  CPC ............... *G06T 2207/10028* (2013.01); *G06T 2207/30168* (2013.01); *G06T 2219/2016* (2013.01)
(58) Field of Classification Search
  CPC ... G06T 2207/30168; G06T 2219/2016; Y02P 90/30
  See application file for complete search history.

(56) References Cited

U.S. PATENT DOCUMENTS

| | | | |
|---|---|---|---|
| 2023/0032036 A1* | 2/2023 | Wang | G06T 19/20 |
| 2024/0040104 A1* | 2/2024 | Xu | H04N 21/6587 |
| 2024/0221305 A1* | 7/2024 | Xu | G06T 9/001 |
| 2025/0014162 A1* | 1/2025 | Xu | G06T 19/20 |

OTHER PUBLICATIONS

Extended European Search Report in Application No. 22897906.8, dated Aug. 7, 2025, 8 pages.
Yujie Zhang et al., "MS-GraphSIM: Inferring Point Cloud Quality via Multiscale Graph Similarity", Proceedings of the 45th International ACM SIGIR Conference on Research and Development in Information Retrieval, ACMPUB27, New York, NY, USA, Oct. 17, 2021, pp. 1230-1238, XP059240085, DOI: 10.1145/3474085.3475294 ISBN: 978-1-4503-8732-3.
Qi Yang et al., "Inferring Point Cloud 1-15 Quality via Graph Similarity", arxiv.org, Cornell University Library, 201 Olin Library Cornell University Ithaca, NY 14853, May 31, 2020, XP081677353.
International Search Report in Application No. PCT/CN2022/134212, dated Jan. 20, 2023, 4 pages, including translation.
Yiling Xu et al., "Challenges and Key Technologies of Point Cloud Quality Assessment", Journal of Communication University of China (Science and Technology), vol. 28, No. 5, Oct. 31, 2021, 12 pages.

* cited by examiner

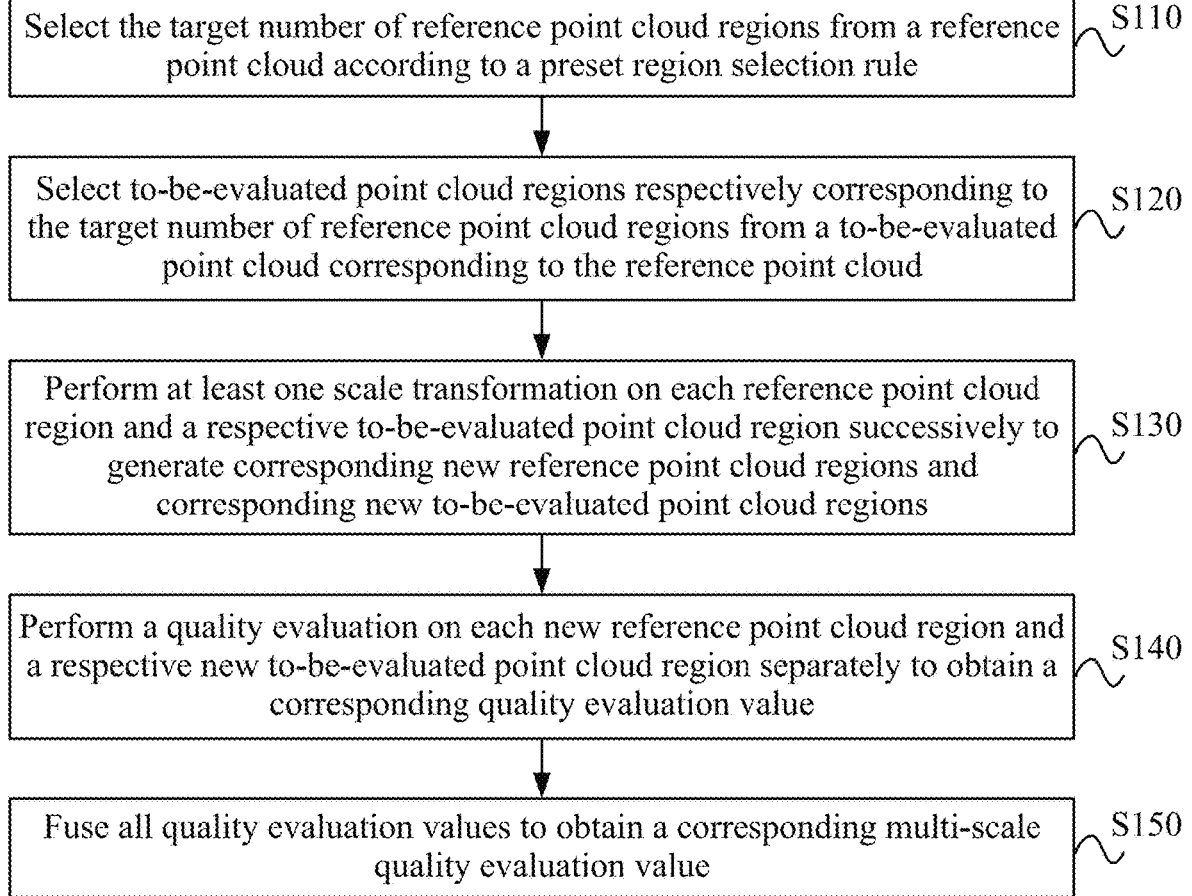

Select the target number of reference point cloud regions from a reference point cloud according to a preset region selection rule ⟿ S110

Select to-be-evaluated point cloud regions respectively corresponding to the target number of reference point cloud regions from a to-be-evaluated point cloud corresponding to the reference point cloud ⟿ S120

Perform at least one scale transformation on each reference point cloud region and a respective to-be-evaluated point cloud region successively to generate corresponding new reference point cloud regions and corresponding new to-be-evaluated point cloud regions ⟿ S130

Perform a quality evaluation on each new reference point cloud region and a respective new to-be-evaluated point cloud region separately to obtain a corresponding quality evaluation value ⟿ S140

Fuse all quality evaluation values to obtain a corresponding multi-scale quality evaluation value ⟿ S150

FIG. 1

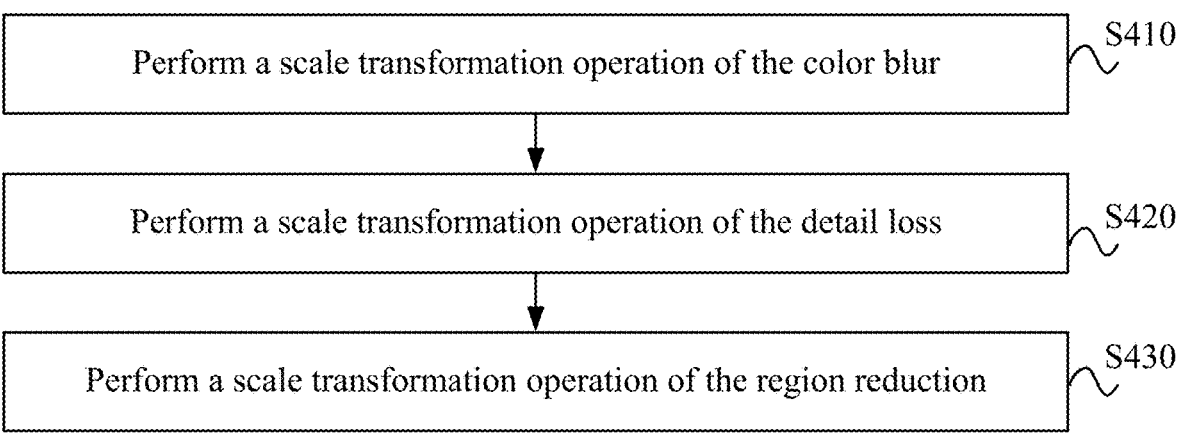

Perform a scale transformation operation of the color blur ∿S410

Perform a scale transformation operation of the detail loss ∿S420

Perform a scale transformation operation of the region reduction ∿S430

FIG. 4

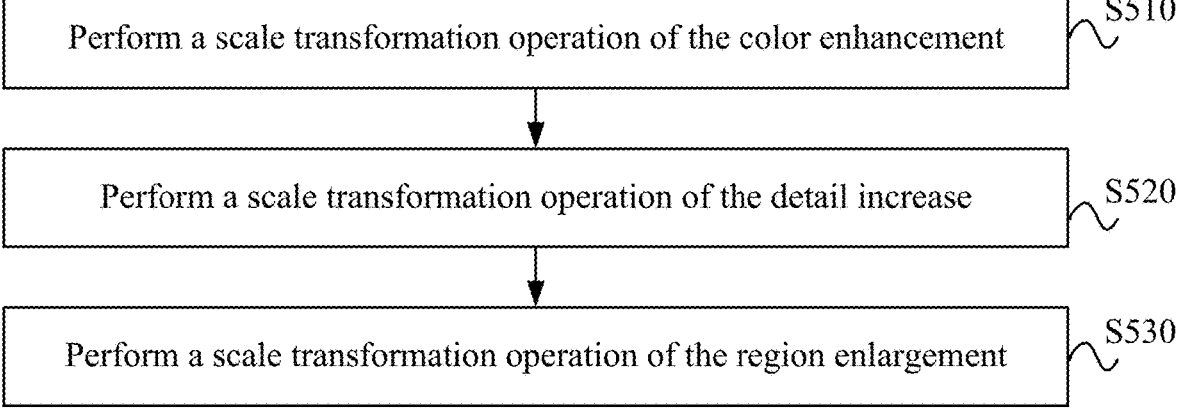

Perform a scale transformation operation of the color enhancement ∿S510

Perform a scale transformation operation of the detail increase ∿S520

Perform a scale transformation operation of the region enlargement ∿S530

FIG. 5

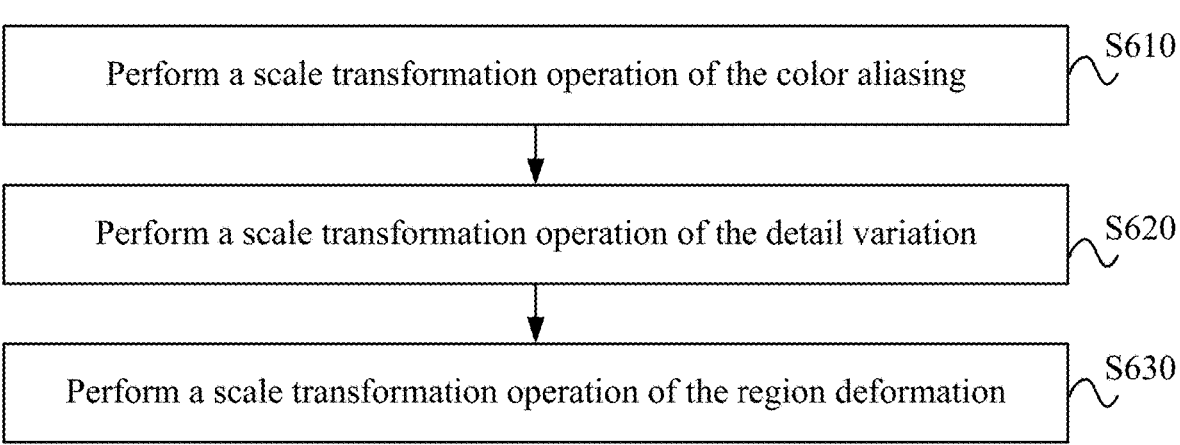

Perform a scale transformation operation of the color aliasing ∿S610

Perform a scale transformation operation of the detail variation ∿S620

Perform a scale transformation operation of the region deformation ∿S630

FIG. 6

POINT CLOUD QUALITY EVALUATION METHOD, AND DEVICE AND STORAGE MEDIUM

CROSS REFERENCE TO RELATED APPLICATIONS

This is a National Stage Application filed under 35 U.S.C. 371 based on International Patent Application No. PCT/CN2022/134212, filed on Nov. 25, 2022, which claims priority to Chinese Patent Application No. 202111424084.8 filed on Nov. 26, 2021, the disclosures of both of which are incorporated herein by reference in their entireties.

TECHNICAL FIELD

The present application relates to the field of communications, for example, a point cloud quality evaluation method and device and a storage medium.

BACKGROUND

As three-dimensional scanning technology and systems grow increasingly mature, a three-dimensional (3D) scanner has a reduced manufacturing cost and improved precision, and point cloud data based on three-dimensional coordinate information of the surface of an actual object may be quickly and precisely acquired and stored so that the point cloud data can be gradually widely applied in various image processing fields. Meanwhile, a point cloud is also one of the most popular types of immersive media in virtual reality, augmented reality and mixed reality applications.

The point cloud data is three-dimensional coordinate data information obtained after three-dimensional scanning of an object, that is, geometry information. Meanwhile, attribute information of a corresponding point, such as color, reflectivity and a normal vector, may also be recorded. The amount of the point cloud data may reach millions or even a larger order of magnitude. Massive point cloud data brings a heavy burden to computer storage, processing and transmission. Therefore, the point cloud data needs to be compressed before being stored and transmitted. The compression may cause damage to the point cloud data to a certain extent, and the compression performance needs to be evaluated by evaluating the quality of the point cloud data after decompression and restoration. In the related art, an objective quality evaluation algorithm for a point cloud ignores a multi-scale characteristic of a human visual system, that is, the perception of the same object by a human eye varies with variations in a viewing distance, a viewing angle, or a viewing point. Therefore, how to perform an objective quality evaluation of a point cloud based on a human visual characteristic is a problem to be solved urgently.

SUMMARY

In an embodiment, an embodiment of the present application provides a point cloud quality evaluation method. The method includes the steps below.

The target number of reference point cloud regions is selected from a reference point cloud according to a preset region selection rule.

To-be-evaluated point cloud regions respectively corresponding to the target number of reference point cloud regions are selected from a to-be-evaluated point cloud corresponding to the reference point cloud.

At least one scale transformation is performed on each of the target number of reference point cloud regions and a respective one of the to-be-evaluated point cloud regions successively to generate corresponding new reference point cloud regions and corresponding new to-be-evaluated point cloud regions.

A quality evaluation is performed on each of the new reference point cloud regions and a respective one of the new to-be-evaluated point cloud regions separately to obtain a corresponding quality evaluation value.

All quality evaluation values are fused to obtain a corresponding multi-scale quality evaluation value.

In an embodiment, an embodiment of the present application provides a point cloud quality evaluation apparatus. The apparatus includes a first selection module, a second selection module, a transformation module, an evaluation module and a first determination module.

The first selection module is configured to select the target number of reference point cloud regions from a reference point cloud according to a preset region selection rule.

The second selection module is configured to select to-be-evaluated point cloud regions respectively corresponding to the target number of reference point cloud regions from a to-be-evaluated point cloud corresponding to the reference point cloud.

The transformation module is configured to successively perform at least one scale transformation on each of the target number of reference point cloud regions and a respective one of the to-be-evaluated point cloud regions to generate corresponding new reference point cloud regions and corresponding new to-be-evaluated point cloud regions.

The evaluation module is configured to separately perform a quality evaluation on each of the new reference point cloud regions and a respective one of the new to-be-evaluated point cloud regions to obtain a corresponding quality evaluation value.

The first determination module is configured to fuse all quality evaluation values to obtain a corresponding multi-scale quality evaluation value.

An embodiment of the present application provides a device. The device includes a communication module, a memory and one or more processors.

The communication module is configured to perform communication interaction with another device.

The memory is configured to store one or more programs.

When executed by the one or more processors, the one or more programs cause the one or more processors to perform the method of any preceding embodiment.

An embodiment of the present application provides a storage medium storing a computer program which, when executed by a processor, causes the processor to perform the method of any preceding embodiment.

BRIEF DESCRIPTION OF DRAWINGS

FIG. 1 is a flowchart of a point cloud quality evaluation method according to an embodiment of the present application.

FIG. 4 is a flowchart of a scale transformation according to an embodiment of the present application.

FIG. 5 is a flowchart of another scale transformation according to an embodiment of the present application.

FIG. 6 is a flowchart of yet another scale transformation according to an embodiment of the present application.

DETAILED DESCRIPTION

Figure 2:
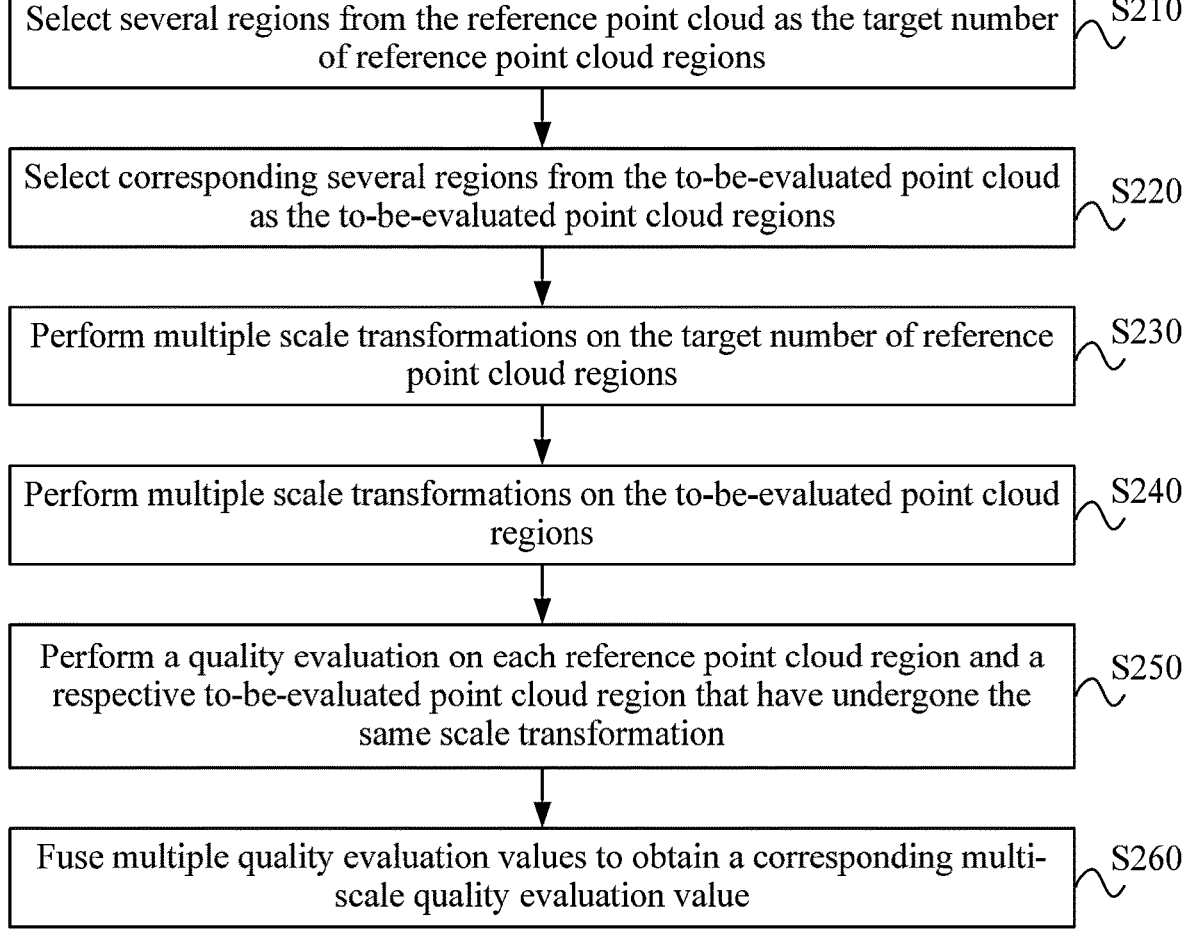
FIG. 2 is a flowchart of another point cloud quality evaluation method according to an embodiment of the present application.

Embodiments of the present application are described hereinafter in conjunction with the drawings. The present application is described hereinafter in conjunction with the embodiments and the drawings. The examples listed hereinafter are merely intended to explain the present application and not to limit the scope of the present application.

An image quality evaluation is the perception, measurement and evaluation of variations and distortions in the information of two images having the same main content. The image quality evaluation may be classified into a subjective quality evaluation and an objective quality evaluation according to whether a person is involved. The subjective quality evaluation means that to-be-evaluated images and reference images are played alternately to an observer according to a certain rule and are then scored by the observer, and the average value of all scores is used as the evaluation value of the sequence finally. The objective quality evaluation is to utilize a mathematical model to simulate the subjective perception of a human eye and conclude a calculation result. Point cloud data includes geometry information and attribute information, so an objective quality evaluation of a point cloud may be classified into geometry distortion and attribute distortion. The geometry distortion refers to a geometry distance distortion measurement of corresponding points of a reference point cloud and a to-be-evaluated point cloud. The attribute distortion refers to an attribute distortion measurement of the corresponding points of the reference point cloud and the to-be-evaluated point cloud. The reference point cloud refers to an original point cloud, which may be original data directly collected before encoding or may also be point cloud data generated or acquired in any manner. The to-be-evaluated point cloud refers to a point cloud whose quality is evaluated by referring to the reference point cloud, which may be a reconstructed point cloud after the loss of compression and encoding of the reference point cloud or may also be a point cloud after any processing of the reference point cloud. Different from a conventional two-dimensional media type such as a picture, points in a point cloud are distributed in three-dimensional space, have a complex connection relationship between each other and are simultaneously affected by a viewer's viewing angle, viewing distance and viewing direction so that the objective quality evaluation of point cloud data becomes more complex.

In the related art, an objective quality evaluation algorithm for a point cloud ignores a multi-scale characteristic of a human visual system, that is, the perception of the same object by a human eye varies with variations in a viewing distance, a viewing angle, or a viewing point, that is, the viewer, that is, a user observing the point cloud, may observe the point cloud at different viewing distances, different viewing angles, or different viewing points. The viewing distance refers to the distance from the viewer to a viewing target. The viewing angle refers to an angle formed by the viewer's sight and the viewing target. Viewing points refers to different spatial positions in which the viewer views the point cloud data. Specifically, as the viewing distance increases, the perception of the same object by the human eye has the features of color blur, detail loss and scale reduction. As the viewing distance decreases, the perception of the same object by the human eye has the features of color refinement, detail increase and scale enlargement. As the viewing angle varies, the perception of the same object by the human eye has the features of color aliasing and detail loss after occlusion. As the viewing point varies, the perception of the same object by the human eye has the features of variations in color and details after occlusion. These features are not considered in the objective quality evaluation algorithm for a point cloud in the related art. Therefore, the design of a multi-scale objective quality evaluation method for a point cloud is very urgent.

In an embodiment, FIG. 1 is a flowchart of a point cloud quality evaluation method according to an embodiment of the present application. This embodiment is applied to a terminal device. As shown in FIG. 1, this embodiment includes S110 to S150.

In S110, the target number of reference point cloud regions is selected from a reference point cloud according to a preset region selection rule.

It is to be noted that the viewing target is three-dimensionally scanned by a three-dimensional measuring device to obtain corresponding original three-dimensional coordinate data as a reference point cloud. It is to be understood that the reference point cloud refers to original three-dimensional coordinate data and attribute information that are obtained by three-dimensionally pre-scanning the viewing target. In the embodiment, the reference point cloud may be understood as an original point cloud, that is, original data directly collected and acquired without undergoing processing operations such as encoding. Certainly, the reference point cloud may also be any other point cloud data. The three-dimensional measuring device may include one of: a three-dimensional coordinate measuring machine, a three-dimensional laser scanner, or a photographic scanner. Certainly, the numbers of point clouds acquired by different three-dimensional measuring devices are different, and the three-dimensional measuring device may be adaptively selected according to accrual situations.

In the embodiment, the target number of reference point cloud regions that needs to be selected from the reference point cloud is related to the characteristics of the reference point cloud. For example, the characteristics of the reference point cloud include: the distribution of points in the reference point cloud, the number of points in the reference point cloud and color attribute in the reference point cloud.

In S120, to-be-evaluated point cloud regions respectively corresponding to the target number of reference point cloud regions are selected from a to-be-evaluated point cloud corresponding to the reference point cloud.

The to-be-evaluated point cloud refers to a point cloud whose quality is evaluated by referring to a respective reference point cloud. Exemplarily, the to-be-evaluated point cloud may be a reconstructed point cloud after the loss of compression and encoding of the respective reference point cloud or may also be a point cloud after any processing of the respective reference point cloud. In the embodiment, the number of to-be-evaluated point cloud regions selected from the to-be-evaluated point cloud is the same as the target number of reference point cloud regions, and positions of the to-be-evaluated point cloud regions among the to-be-evaluated point cloud are the same as positions of corresponding reference point cloud regions among corresponding reference point cloud. In an actual operation process, to ensure that the to-be-evaluated point cloud regions respectively corresponding to the target number of reference point cloud regions may be accurately selected from the to-be-evaluated point cloud, a selection rule for the to-be-evaluated point cloud regions may be the same as the selection rule for the corresponding target number of reference point cloud regions.

In S130, at least one scale transformation is performed on the reference point cloud region and a respective to-be-evaluated point cloud region successively to generate corresponding new reference point cloud regions and corresponding new to-be-evaluated point cloud regions.

Each scale transformation refers to a variation in the perception of the same object by the human eye as the viewing distance, the viewing angle, or the viewing point varies according to the visual characteristics of the human eye. In the embodiment, the at least one scale transformation is first performed on the reference point cloud region to generate the corresponding new reference point cloud regions; and then the same at least one scale transformation performed on the reference point cloud region is performed on the respective to-be-evaluated point cloud region to generate the corresponding new to-be-evaluated point cloud regions. It is to be understood that the number of times of scale transformations performed on each to-be-evaluated point cloud region is the same as the number of times of scale transformations performed on a respective reference point cloud region, and the operations for performing the scale transformations are also the same.

In S140, a quality evaluation is performed on each new reference point cloud region and a respective new to-be-evaluated point cloud region separately to obtain a corresponding quality evaluation value.

In the embodiment, the quality evaluation is performed on each new reference point cloud region and the respective new to-be-evaluated point cloud region that have undergone the same at least one scale transformation to obtain the corresponding quality evaluation value. For a quality evaluation strategy, references may be made to any quality evaluation strategy for a point cloud in the related art. This is not limited herein. Exemplarily, the quality evaluation strategy for a point cloud may be peak signal-to-noise ratio (PSNR).

In S150, all quality evaluation values are fused to obtain a corresponding multi-scale quality evaluation value.

In the embodiment, all the quality evaluation values are fused, or several quality evaluation values may also be selected for fusion to obtain the corresponding multi-scale quality evaluation value. In the embodiment, by virtue of multiple scale transformations performed on the reference point cloud region and the respective to-be-evaluated point cloud region, a factor in which the perception of the same object by the human eye varies with variations in the viewing distance or the viewing angle is considered so that the evaluation efficiency can be improved based on that the evaluation reliability is ensured.

In an embodiment, that the target number of reference point cloud regions is selected from the reference point cloud according to the preset region selection rule includes that the target number of key shapes is determined on the reference point cloud, and a spatial neighborhood of each key shape is selected as a corresponding reference point cloud region.

In an embodiment, the target number of key shapes is determined in one of the following manners:

the target number of key shapes is selected according to geometry information of the reference point cloud; the density distribution of points in the reference point cloud is acquired according to the geometry information of the reference point cloud, and the target number of key shapes is selected according to the density distribution; high-pass filtering is performed on the geometry information of the reference point cloud to obtain the target number of key shapes; high-pass filtering is performed on color information of the reference point cloud to obtain the target number of key shapes; the target number of key shapes is obtained according to the geometry information and the color information of the reference point cloud; the target number of key shapes is obtained according to non-color attribute information of the reference point cloud; the target number of key shapes is obtained according to the geometry information and the non-color attribute information of the reference point cloud; the target number of key shapes is obtained according to attribute information of the reference point cloud; or the target number of key shapes is obtained according to the geometry information and the attribute information of the reference point cloud.

In an embodiment, the target number of key shapes includes one of: a key point, a key edge, a key surface, or a key region.

In an embodiment, in response to a viewing distance from a viewer to the reference point cloud increasing, that the at least one scale transformation is performed on the reference point cloud region and the respective to-be-evaluated point cloud region successively to generate the corresponding new reference point cloud regions and the corresponding new to-be-evaluated point cloud regions includes that low-pass filtering, downsampling and region-shrinking are performed on the reference point cloud region successively to generate the corresponding new reference point cloud regions; and low-pass filtering, downsampling and region-shrinking are performed on the respective to-be-evaluated point cloud region corresponding to the reference point cloud region successively to generate the corresponding new to-be-evaluated point cloud regions. In the embodiment, the perception of the same viewing point cloud by the viewer's eye varies with variations in the viewing distance. To improve the reliability of the multi-scale quality evaluation value, the increase in the viewing distance from the viewer to the same viewing point cloud is considered, multiple scale transformations are performed on the reference point cloud region in the reference point cloud and the respective to-be-evaluated point cloud region in the to-be-evaluated point cloud adaptively to obtain the new reference point cloud regions and the new to-be-evaluated point cloud regions.

In an embodiment, in response to a viewing distance from a viewer to the reference point cloud decreasing, that the at least one scale transformation is performed on the reference point cloud region and the respective to-be-evaluated point cloud region successively to generate the corresponding new reference point cloud regions and the corresponding new to-be-evaluated point cloud regions includes that interpolation filtering, upsampling and region enlargement operations are performed on the reference point cloud region successively to generate the corresponding new reference point cloud regions; and interpolation filtering, upsampling and region enlargement operations are performed on the respective to-be-evaluated point cloud region corresponding to the reference point cloud region successively to generate the corresponding new to-be-evaluated point cloud regions. In the embodiment, the perception of the same viewing point cloud by the viewer's eye varies with variations in the viewing distance. To improve the reliability of the multi-scale quality evaluation value, the decrease in the viewing distance from the viewer to the same viewing point cloud is considered, multiple scale transformations are performed on the reference point cloud region in the reference point cloud and the respective to-be-evaluated point cloud region in the to-be-evaluated point cloud adaptively to obtain the new reference point cloud regions and the new to-be-evaluated point cloud regions.

In an embodiment, in response to a viewer's viewing angle varying when the viewer views the reference point cloud, that the at least one scale transformation is performed on the reference point cloud region and the respective to-be-evaluated point cloud region successively to generate the corresponding new reference point cloud regions and the corresponding new to-be-evaluated point cloud regions includes that low-pass filtering, visibility determination and point position adjustment caused by region deformation on the reference point cloud region successively to generate the corresponding new reference point cloud regions; and low-pass filtering, visibility determination and point position adjustment caused by region deformation are performed on the respective to-be-evaluated point cloud region corresponding to the reference point cloud region successively to generate the corresponding new to-be-evaluated point cloud regions.

The visibility determination refers to determining whether the viewer can see points in the reference point cloud region and the respective to-be-evaluated point cloud region in a case where the viewer views the point cloud at a certain viewing angle. In the embodiment, as the viewing angle varies, in the reference point cloud or the to-be-evaluated point cloud, some points are visible, and some points are invisible. In the embodiment, whether each point is visible at the current viewing angle is calculated according to set information of each point, and if invisible, each point does not participate in the point cloud quality evaluation.

In an embodiment, in response to a viewer's viewing point varying when the viewer views the reference point cloud, that the at least one scale transformation is performed on the reference point cloud region and the respective to-be-evaluated point cloud region successively to generate the corresponding new reference point cloud regions and the corresponding new to-be-evaluated point cloud regions includes that low-pass filtering, visibility determination and point position adjustment caused by region deformation are performed on the reference point cloud region successively to generate the corresponding new reference point cloud regions; and low-pass filtering, visibility determination and point position adjustment caused by region deformation are performed on the respective to-be-evaluated point cloud region corresponding to the reference point cloud region successively to generate the corresponding new to-be-evaluated point cloud regions.

The visibility determination refers to determining whether the viewer can see points in the reference point cloud region and the respective to-be-evaluated point cloud region in a case where the viewer views the point cloud at a certain space position. In the embodiment, as the viewing point varies, in the reference point cloud or the to-be-evaluated point cloud, some points are visible, and some points are invisible. In the embodiment, whether each point is visible at the current viewing point is calculated according to set information of each point, and if invisible, each point does not participate in the point cloud quality evaluation.

In an embodiment, that the at least one scale transformation is performed on the reference point cloud region and the respective to-be-evaluated point cloud region successively to generate the corresponding new reference point cloud regions and the corresponding new to-be-evaluated point cloud regions further includes that the at least one scale transformation is performed on the reference point cloud region and the respective to-be-evaluated point cloud region successively according to a predetermined connection relationship between points to generate the corresponding new reference point cloud regions and the corresponding new to-be-evaluated point cloud regions. In the embodiment, a key point is selected from the reference point cloud, and a region is determined with the key point as the center and a certain value as the radius. The value is the maximum distance from a non-key point to the key point in the region, and a connection relationship is established between all points conforming to the preceding definition in the region. For example, a Gaussian function is used for establishing the connection relationship, and a matrix describing the connection relationship of the points in the preceding region is obtained, for example, an adjacency matrix, a degree matrix and a transition matrix. In the embodiment, the connection relationship between points is used for performing the at least one scale transformation on the reference point cloud region and the respective to-be-evaluated point cloud region.

In an embodiment, that all the quality evaluation values are fused to obtain the corresponding multi-scale quality evaluation value includes that an average value of all the quality evaluation values or an average value of part of all the quality evaluation values is determined as the multi-scale quality evaluation value; or a weighted average value of all the quality evaluation values or a weighted average value of part of all the quality evaluation values is determined as the multi-scale quality evaluation value.

In an embodiment, before the at least one scale transformation is performed on the reference point cloud region and the respective to-be-evaluated point cloud region successively to generate the corresponding new reference point cloud regions and the corresponding new to-be-evaluated point cloud regions, the method further includes that a color variation situation and/or an occlusion situation at different viewing distances or different viewing angles are determined according to non-color attribute information of the reference point cloud.

In an embodiment, the non-color attribute information includes at least one of: reflectivity, a normal vector, or transparency.

In an embodiment, a reference point cloud region for the at least one scale transformation includes one of: an original reference point cloud region or a latest transformed reference point cloud region.

A to-be-evaluated point cloud region for the at least one scale transformation includes one of: an original to-be-evaluated point cloud region or a latest transformed to-be-evaluated point cloud region. The original reference point cloud region refers to a point cloud region selected from the reference point cloud that have not undergone any scale transformation. The original to-be-evaluated point cloud region refers to a point cloud region selected from the to-be-evaluated point cloud that have not undergone any scale transformation. In the embodiment, in the process of performing multiple scale transformations, a scale transformation may be performed on the original reference point cloud region and the original to-be-evaluated point cloud region each time to generate a new reference point cloud region and a new to-be-evaluated point cloud region, and the new reference point cloud region and the new to-be-evaluated point cloud region after each scale transformation are then used for calculating the quality evaluation value; or a scale transformation may also be performed on a new reference point cloud region and a new to-be-evaluated point cloud region that are generated by the last scale transformation to regenerate a transformed new reference point cloud region and a transformed new to-be-evaluated point cloud region, and the new reference point cloud region and the new to-be-evaluated point cloud region after each scale transformation are then used for calculating the quality evaluation value.

In an embodiment, in a case where all the reference point cloud regions and the corresponding to-be-evaluated point cloud regions are at the same viewing distance, in a scale transformation, all the reference point cloud regions and all the corresponding to-be-evaluated point cloud regions adopt the same scale transformation.

In a case where all the reference point cloud regions and the corresponding to-be-evaluated point cloud regions are not at the same viewing distance, in a scale transformation, different scale transformations are used between all the reference point cloud regions and all the corresponding to-be-evaluated point cloud regions.

In an embodiment, the number of times of scale transformations performed on the reference point cloud region and the respective to-be-evaluated point cloud region is related to the number of points included in the regions. In the embodiment, different reference point cloud regions include different details. For example, some regions each include more points, some regions each include fewer points, some regions each have a single color, some regions each have rich colors, some regions each have a slow color variation, and some regions each have a fast color variation. It is to be understood that the different numbers of times of scale transformations are used for different reference point cloud regions and corresponding to-be-evaluated point cloud regions. For example, K scale transformations may be performed on a reference point cloud region including more points and a corresponding to-be-evaluated point cloud region, and K−1 scale transformations may be performed on a reference point cloud region including fewer points and a corresponding to-be-evaluated point cloud region.

In an embodiment, FIG. 2 is a flowchart of another point cloud quality evaluation method according to an embodiment of the present application. As shown in FIG. 2, several regions are selected from the reference point cloud as the target number of reference point cloud regions, and corresponding several regions are selected from the to-be-evaluated point cloud as the to-be-evaluated point cloud regions. Multiple scale transformations are performed on each of the several regions (that is, the reference point cloud region) selected from the reference point cloud, and a new reference point cloud region is generated after each scale transformation. Accordingly, the same multiple scale transformations are performed on each of the corresponding several regions (that is, the respective to-be-evaluated point cloud region) selected from the to-be-evaluated point cloud, and a new to-be-evaluated point cloud region is generated after each scale transformation. A quality evaluation is performed on a new reference point cloud region and a new corresponding to-be-evaluated point cloud region that are generated by the same scale transformation to generate a quality evaluation value. Finally, multiple quality evaluation values are fused. The point cloud quality evaluation method in FIG. 2 includes the steps below.

In S210, several regions are selected from the reference point cloud as the target number of reference point cloud regions.

In the embodiment, M regions are selected from the reference point cloud as the target number of reference point cloud regions, and each region RPm includes several points in the reference point cloud. The value of m ranges from 1 to M, and the value of M ranges from 1 to the number of points in the reference point cloud. M may be set according to actual needs.

In an embodiment, the region selection rule may be that key points may be determined first, then spatial neighborhoods of the key points are selected as to-be-scale-transformed regions (which may also be referred to as the target number of reference point cloud regions), and each key point corresponds to a region. The key points may be determined according to the geometry information. For example, M key points are selected randomly from different positions of the point cloud, or M key points may also be selected from fixed positions of the point cloud; the density distribution of the points in the reference point cloud is obtained according to the geometry information, and M point cloud distribution concentration points may also be selected as the key points according to the density distribution; high-pass filtering may also be performed on the geometry information to obtain M key points; high-pass filtering may also be performed on the color information to obtain M key points; M key points may also be obtained according to the combination of the geometry information and the color information; M key points may also be obtained according to other non-color attribute information; M key points may also be obtained according to the combination of the geometry information and the other non-color attribute information; M key points may also be obtained according to all the attribute information; or M key points may also be obtained according to the geometry information and all the attribute information. Regions in which the key points are located may be spherical regions with the key points as the centers and radii of R, or may also be cubic regions with the key points as the centers and side lengths of D, or may also be of any shapes with the key points as the centers. After the regions are determined, the information of the regions is recorded. The information of the regions includes the M key points of the reference point cloud and shape description information of the regions in which the key points are located. The shape description information of the regions may be a sphere and a spherical radius or a cube and a cubic side length.

In an embodiment, the region selection rule may be that key edges may be determined first, then spatial neighborhoods of the key edges are selected as to-be-scale-transformed regions (which may also be referred to as the target number of reference point cloud regions), and each key edge corresponds to a region, where each key edge is determined by at least two or more points. The key edges may be determined according to the geometry information. For example, M key edges are selected randomly from different positions of the point cloud, or M key edges may also be selected from fixed positions of the point cloud; the density distribution of the points in the reference point cloud is obtained according to the geometry information, and M key edges that each have concentratedly distributed points may also be selected according to the density distribution; high-pass filtering may also be performed on the geometry information to obtain M key edges; high-pass filtering may also be performed on the color information to obtain M key edges; M key edges may also be obtained according to the combination of the geometry information and the color information; M key edges may also be obtained according to other non-color attribute information; M key edges may also be obtained according to the combination of the geometry information and the other non-color attribute information; M key edges may also be obtained according to all the attribute information; or M key edges may also be obtained according to the geometry information and all the attribute information. The key edges each include N points, and N may be set according to actual needs. The key edges may be straight lines or curved lines. Regions in which the key edges are located may be spherical regions including the key edges and having radii of R, or may also be cubic regions including the key edges and having side lengths of D, or may also be of any shapes including the key edges. After the regions are determined, the information of the regions is recorded. The information of the regions includes the M key edges of the reference point cloud and shape description information of the regions in which the key edges are located. The shape description information of the regions may be a sphere and a spherical radius or a cube and a cubic side length.

In an embodiment, the region selection rule may be that key surfaces may be determined first, then spatial neighborhoods of the key surfaces are selected as to-be-scale-transformed regions (which may also be referred to as the target number of reference point cloud regions), and each key surface has a region, where each key surface may be determined by at least two edges. The key surfaces may be determined according to the geometry information. For example, M key surfaces are selected randomly from different positions of the point cloud, or M key surfaces may also be selected from fixed positions of the point cloud; the density distribution of the points in the reference point cloud is obtained according to the geometry information, and M key surfaces that each have concentratedly distributed points may also be selected according to the density distribution; high-pass filtering may also be performed on the geometry information to obtain M key surfaces; high-pass filtering may also be performed on the color information to obtain M key surfaces; M key surfaces may also be obtained according to the combination of the geometry information and the color information; M key surfaces may also be obtained according to other non-color attribute information; M key surfaces may also be obtained according to the combination of the geometry information and the other non-color attribute information; M key surfaces may also be obtained according to all the attribute information; or M key surfaces may also be obtained according to the geometry information and all the attribute information. The key surfaces each include N points, and N may be set according to actual needs. The shapes of the key surfaces may be any curved surfaces. Regions in which the key surfaces are located may be spherical regions including the key surfaces and having radii of R, or may also be cubic regions including the key surfaces and having side lengths of D, or may also be of any shapes including the key surfaces. After the regions are determined, the information of the regions is recorded. The information of the regions includes the M key surfaces of the reference point cloud and shape description information of the regions in which the key surfaces are located. The shape description information of the regions may be a sphere and a spherical radius or a cube and a cubic side length.

In an embodiment, the region selection rule may be that key regions may be determined, that is, the key regions are to-be-scale-transformed regions (may also be referred to as the target number of reference point cloud regions). The key regions may be determined according to the geometry information. For example, M key regions are selected randomly from different positions of the point cloud, or M key regions may also be selected from fixed positions of the point cloud; the density distribution of the points in the reference point cloud is obtained according to the geometry information, and M key regions that each have concentratedly distributed points may also be selected according to the density distribution; high-pass filtering may also be performed on the geometry information to obtain M key regions; high-pass filtering may also be performed on the color information to obtain M key regions; M key regions may also be obtained according to the combination of the geometry information and the color information; M key regions may also be obtained according to other non-color attribute information; M key regions may also be obtained according to the combination of the geometry information and the other non-color attribute information; M key regions may also be obtained according to all the attribute information; or M key regions may also be obtained according to the geometry information and all the attribute information. The key regions each include N points, and N may be set according to actual needs. The shapes of the key regions may be spherical regions having radii of R, or may also be cubic regions having side lengths of D, or may also be any shapes. After the key regions are determined, the information of the key regions is recorded. The information of the key regions includes shape description information of the M key regions of the reference point cloud. The shape description information of the M key regions may be a sphere and a spherical radius or a cube and a cubic side length.

The preceding selected regions may have no intersection, that is, different regions include completely different points, or may have an intersection, that is, different regions may include some same points.

The information of the selected regions may be denoted using a global three-dimensional coordinate system, for example, using (X, Y, Z) to denote a key point and eight vertices of a cubic region, or may also be denoted using a polar coordinate system, for example, using a center point and a radius to denote the range of a spherical region.

In S220, corresponding several regions are selected from the to-be-evaluated point cloud as the to-be-evaluated point cloud regions.

In the embodiment, the corresponding several regions $P_m$ are selected from the to-be-evaluated point cloud according to the information of the target number of reference point cloud regions recorded in S210. The corresponding several regions refer to regions of the reference point cloud and the to-be-evaluated point cloud at the same positions under the same coordinate system.

In S230, multiple scale transformations are performed on the target number of reference point cloud regions.

K scale transformations are performed on the M regions RPm selected in S210, and new regions $NRP_{m,k}$ are generated after each scale transformation. The value of k ranges from 1 to K, and K may be set according to actual needs.

Each scale transformation refers to a variation in the perception of the same object by the human eye as the viewing distance varies according to the visual characteristics of the human eye.

In S240, multiple scale transformations are performed on the to-be-evaluated point cloud regions.

The same K multi-scale transformation operations performed on the corresponding reference point cloud regions in S230 are performed on the regions $P_m$ selected from the to-be-evaluated point cloud to generate new regions $NP_{m,k}$.

In S250, a quality evaluation is performed on the reference point cloud region and a respective to-be-evaluated point cloud region that have undergone the same scale transformation.

In the embodiment, the quality evaluation is performed on the reference point cloud region $NRP_{m,k}$ and the respective to-be-evaluated point cloud region $NP_{m,k}$ that have undergone the same scale transformation to calculate a quality evaluation value $Q_{m,k}$. Any point cloud quality evaluation method in the related art may be used for the quality evaluation, for example, PSNR.

In S260, multiple quality evaluation values are fused to obtain a corresponding multi-scale quality evaluation value.

All the quality evaluation values $Q_{m,k}$ are fused, or several quality evaluation values may also be selected for fusion. A fusion method may be an average value of all the $Q_{m,k}$ or may also be a weighted average value of all the $Q_{m,k}$.

For example, there are a total of N quality evaluation values $Q_i$, and the formula for calculating the total quality score is:

$$Q = \frac{\sum_{i=0}^{N} \mu_i Q_i}{\sum_{i=0}^{N} \mu_i}.$$

$\mu_i$ denotes a weighted coefficient of each quality evaluation value.

A finally generated quality evaluation fused value Q is the final multi-scale quality evaluation value of the to-be-evaluation point cloud.

In the embodiment, S230 may be performed before S220.

Figure 3:
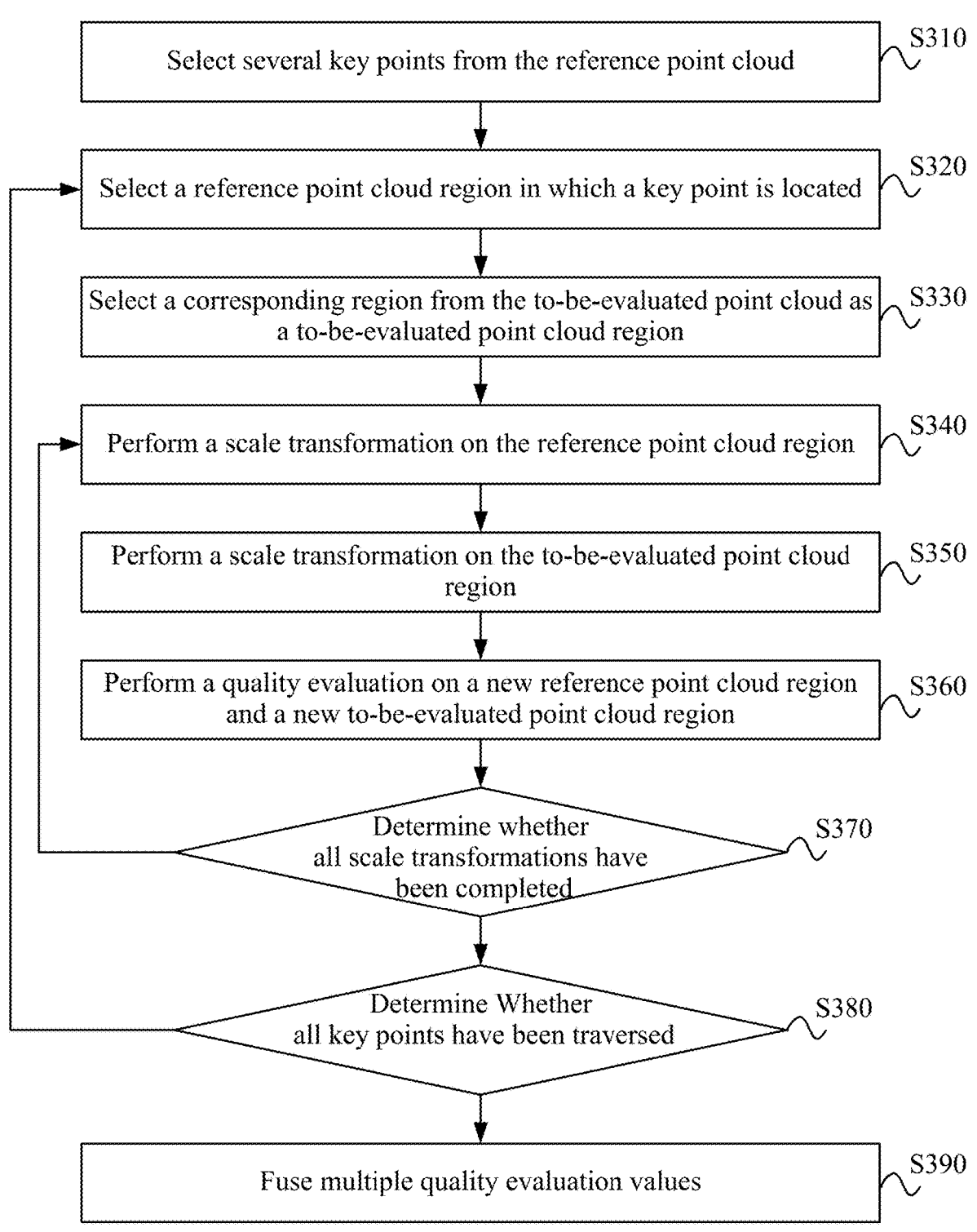
FIG. 3 is a flowchart of yet another point cloud quality evaluation method according to an embodiment of the present application.

In an embodiment, FIG. 3 is a flowchart of yet another point cloud quality evaluation method according to an embodiment of the present application. As shown in FIG. 3, the point cloud quality evaluation method in this embodiment includes S310 to S390.

In S310, several key points are selected from the reference point cloud.

The key point selection rule is the same as the rule in S210.

In S320, a reference point cloud region in which a key point is located is selected.

In the embodiment, a key point is selected from the several key points obtained in S310, the reference point cloud region in which the preceding key point is located is determined according to the preset region selection rule in S210, and the information of the reference point cloud region is recorded.

In S330, a corresponding region is selected from the to-be-evaluated point cloud as a to-be-evaluated point cloud region.

The corresponding region in the to-be-evaluated point cloud is determined according to the information of the reference point cloud region obtained in S320. For the key point in the information of the reference point cloud region, a point at a corresponding position in the to-be-evaluated point cloud is first determined. If the point at the corresponding position is not present, a point closest to the point at the corresponding position is selected as a key point in the to-be-evaluated point cloud. The corresponding region is then selected from the to-be-evaluated point cloud according to the key point, and the selection rule is the same as the rule in S210.

In S340, a scale transformation is performed on the reference point cloud region.

A scale transformation is performed on the region selected from the reference point cloud to generate a new reference point cloud region.

In S350, a scale transformation is performed on the to-be-evaluated point cloud region.

The same scale transformation performed on the reference point cloud region in S340 is performed on the region selected from the to-be-evaluated point cloud to generate a new to-be-evaluated point cloud region.

In S360, a quality evaluation is performed on a new reference point cloud region and a new to-be-evaluated point cloud region.

The quality evaluation is performed on the new reference point cloud region generated in S340 and the new to-be-evaluated point cloud region generated in S350 to obtain a quality evaluation value.

In S370, whether all scale transformations have been completed is determined; if not, the method returns to execute S340; and if yes, S380 is executed.

If all the scale transformations have not been completed, S340 to S360 are repeated; and if all the scale transformations have been completed, S380 is executed.

In S380, whether all key points have been traversed is determined; if not, the method returns to execute S320; and if yes, S390 is executed.

If all the key points have not been traversed, S320 to S370 are repeated; and if all the key points have been traversed, S390 is executed.

In S390, multiple quality evaluation values are fused.

All the quality evaluation values generated in S360 are fused and calculated. The fusion method may be the average value of all the quality evaluation values or may also be the weighted average value of all the quality evaluation values.

The finally generated quality evaluation fused value is the final multi-scale quality evaluation value of the to-be-evaluation point cloud.

In an embodiment, an embodiment of the present application provides a scheme for performing the scale transformations in the preceding embodiment. As the viewing distance increases, the perception of the same object by the human eye has the features of color blur, detail loss and region reduction. These features may be performed using the scale transformations. FIG. 4 is a flowchart of a scale transformation according to an embodiment of the present application. As shown in FIG. 4, the following steps of the scale transformations are executed successively.

In S410, a scale transformation operation of the color blur is performed.

The color blur refers to a color information loss brought by an increase in the viewing distance, which reduces a color variation speed, so that a color transition can be smoother. The color blur may be performed by performing low-pass filtering on the color information of point cloud data or may also be performed by any other method that can achieve the color blur effect.

In S420, a scale transformation operation of the detail loss is performed.

The detail loss refers to a reduction in viewable points brought by an increase in the viewing distance. Downsampling may be performed on the point cloud data processed in S410. The proportion of the downsampling is related to the viewing distance. For example, when the viewing distance is increased by twice, the number of points after the downsampling is half the number of points before sampling. A downsampling method may be random downsampling, that is, a random seed is generated to randomly select points in a region, or may also be system downsampling, that is, reordering is performed according to geometry information of each point in the region, and then sampling is performed at certain intervals, or may also be any sampling method that can reduce the certain number of points. Particularly, if the region no longer includes a key point after the downsampling, a key point needs to be added to the region, or a point closest to the key point is selected as a new key point.

In S430, a scale transformation operation of the region reduction is performed.

The region reduction refers to a reduction in a viewing object after an increase in the viewing distance. Region shrinkage may be performed on the geometry information of the point cloud data processed in S420. A shrinkage method may be an overall region reduction, or may also be that a point in a neighborhood of a key point is moved toward the key point in a case where the overall density of a region remains unvaried, or may also be any method that achieves region shrinkage.

For example, in the case where the local density of the region in which the key point is located remains unvaried, a non-key point in the region in which the key point s is located is moved toward a direction close to the key point s, and a coordinate obtained after transformation of any non-key point $$x_i^G$$

is as follows:

$$\psi(x_i^G) = s^G + \delta(x_i^G - s^G).$$

$\psi(\bullet)$ denotes a local scale shrinkage operator. $\delta$ denotes a shrinkage coefficient for ensuring that the overall density remains unvaried before and after downsampling. The superscript G denotes the geometry information. The reduced region is obtained by performing the same coordinate transformation on all non-key points in the region.

S410 to S430 may be executed in a different order, for example, in an order of S430, S420 and S410.

Only two steps may also be executed, for example, S410 and S430.

Optionally, each step of S410 to S430 may be performed using a neural network model, or all functions of S410 to S430 may also be performed using a neural network model.

In an embodiment, an embodiment of the present application provides another scheme for performing the scale transformations in the preceding embodiment. As the viewing distance decreases, the perception of the same object by the human eye has the features of color enhancement, detail increase and region enlargement. These features may be performed using the scale transformations. FIG. 5 is a flowchart of another scale transformation according to an embodiment of the present application. As shown in FIG. 5, the following steps of the scale transformations are executed successively.

In S510, a scale transformation operation of the color enhancement is performed.

The color enhancement refers to a color information increase, a fast color variation, color sharpening and others that are brought by a reduction in the viewing distance. The color enhancement may be performed by performing interpolation filtering on the color information of the point cloud data or may also be performed by any other method that can achieve the color enhancement effect.

In S520, a scale transformation operation of the detail increase is performed.

The detail increase refers to an increase in viewable points brought by a reduction in the viewing distance. Upsampling may be performed on the point cloud data processed in S510. The proportion of the upsampling is related to the viewing distance. For example, when the viewing distance is reduced by twice, the number of points after the upsampling is twice the number of points before sampling. A sampling method may be random upsampling, that is, a random seed is generated to perform interpolation upsampling on points around the random seed, may also be system upsampling, that is, reordering is performed according to the geometry information of each point in a region, and points are added at certain intervals, or may also be any upsampling method that can increase the certain number of points.

In S530, a scale transformation operation of the region enlargement is performed.

The region enlargement refers to an enlargement of a viewing object after a reduction in the viewing distance. Region enlargement may be performed on the geometry information of the point cloud data processed in S520. An enlargement method may be an overall region enlargement, or may also be that a point in a neighborhood of a key point is moved toward a direction far away from the key point in a case where the overall density of the region remains unvaried, or may also be any method that can achieve region enlargement.

For example, in the case where the local density of the region in which the key point is located remains unvaried, a non-key point in the region in which the key point s is located is moved toward the direction far away from the key point s, and a coordinate obtained after transformation of any non-key point $$x_i^G$$

is as follows:

$$\varphi(x_i^G) = s^G + \delta(x_i^G + s^G).$$

$\varphi(\bullet)$ denotes a local scale enlargement operator. $\delta$ denotes a shrinkage coefficient for ensuring that the overall density remains unvaried before and after downsampling. The superscript G denotes the geometry information. The enlarged region is obtained by performing the same coordinate transformation on all non-key points in the region.

S510 to S530 may be executed in a different order, for example, in an order of S530, S520 and S510.

Only two steps may also be executed, for example, S510 and S530.

Optionally, each step of S510 to S530 may be performed using a neural network model, or all functions of S510 to S530 may also be performed using a neural network model.

In an embodiment, an embodiment of the present application provides yet another scheme for performing the scale transformations in the preceding embodiment. As the viewing angle varies, the perception of the same object by the human eye has the features of color aliasing, detail variation and region deformation after occlusion. These features may be performed using the scale transformations. FIG. 6 is a flowchart of yet another scale transformation according to an embodiment of the present application. As shown in FIG. 6, the following steps of the scale transformations are executed successively.

After the viewing angle varies, geometry information and attribute information of each point in a point cloud are varied due to the occlusion according to information of each point, such as the position, the reflectivity and the transparency. Therefore, the geometry information and the attribute information of each point need to be adjusted according to the preceding variations. For example, a point that is invisible due to the occlusion does not participate in the quality evaluation.

In S610, a scale transformation operation of the color aliasing is performed.

The color aliasing refers to a variation in the color effect due to the mutual effect of colors of adjacent points after the viewing angle varies. This may be performed using a low-pass filter or may also be performed using any other method that can achieve the color aliasing effect.

In S620, a scale transformation operation of the detail variation is performed.

The detail variation refers to that after the viewing angle varies, due to the occlusion, some points are invisible while some points are visible. Whether a point is visible at the current viewing angle is calculated according to geometry information of the point. If invisible, the point does not participate in the quality evaluation. If the region deformation (S530) varies with a key point as the core, the region needs to include the key point.

In S630, a scale transformation operation of the region deformation is performed.

The region deformation refers to a variation in a position relationship between points in a region because the viewer's viewing angle varies when the viewer views a point cloud, that is, the positions of the points are adjusted according to the variations in the viewing angle.

Optionally, each step of S610 to S630 may be performed using a neural network model, or all functions of S610 to S630 may also be performed using a neural network model.

In an embodiment, an embodiment of the present application provides yet another scheme for performing the scale transformations in the preceding embodiment. As the viewer's viewing point varies, the distance from the viewer to a viewed point cloud varies, the direction of the viewer viewing the point cloud varies, and the viewing angle of the viewer viewing the point cloud varies. In this case, the perception of the same object by the human eye has the features of color aliasing, detail variation and region deformation after occlusion. These features may be performed by using the scale transformations.

Same as the preceding variation in the viewing angle, after the viewing point varies, geometry information and attribute information of each point in a point cloud are varied due to the occlusion according to information of each point, such as the position, the reflectivity and the transparency. Therefore, the geometry information and the attribute information of each point need to be adjusted according to the preceding variations.

In an embodiment, an embodiment of the present application provides a scheme for performing the scale transformations, which is based on establishing a connection relationship between points in a key point selection region. A key point s is selected. A region is determined with s as the center and a radius of R. R is the maximum distance from a non-key point to s in the region. A connection relationship is established between all points conforming to the preceding definition in the region. For example, a Gaussian function is used for establishing the connection relationship, and a matrix describing the connection relationship of the points in the preceding region is obtained, for example, an adjacency matrix, a degree matrix and a transition matrix.

The preceding connection relationship between the points may be used for the scale transformations. For example, when color blur processing is performed, the connection relationship between the points is used as a weight to perform low-pass filtering. Alternatively, when detail loss downsampling is performed, the connection relationship between the points is used for performing point selection. Alternatively, when size reduction is performed, the connection relationship between the points is used for calculating a distance moving toward a key point. Alternatively, when the color aliasing is performed, the connection relationship between the points is used as a weight to perform low-pass filtering. Alternatively, the connection relationship between the points is used for calculating the moving position of a point after the viewing angle varies.

For example, for a certain key point s in the original point cloud, a region is determined by s based on a Euclidean distance. The range of the region may be denoted as $N(s,R_s)$ Rs denotes the maximum Euclidean distance from a non-key point to s in the region. A set of all points in the region is defined as $P_s$. A Gaussian function is used for establishing a connection relationship between points in the $P_s$. For geometry information $$P_s^G$$

of two points a,b in the $P_s$, when a threshold $\tau$ is set, a relationship is denoted as follows:

$$W_{a,b} = \begin{cases} e^{-\frac{\|P_s^G(a)-P_s^G(b)\|_2^2}{\sigma^2}}, & \text{if } \|P_s^G(a)-P_s^G(b)\| \le \tau; \\ 0, & \text{else} \end{cases}$$

If $W_{a,b} \ne 0$, this represents that a spatial dependence relationship is present between the two points a,b, and the dependence degree is positively related to the Euclidean distance. According to a spatial dependence relationship between points, for a point set $P_s$ of a region, an adjacency matrix W describing a connection relationship between points may be obtained, and a degree matrix $$D\left(D_{i,i} = \sum_j^N W_{i,j}\right)$$

and a transition matrix $A=D^{-1}W$ may be obtained.

When the color blur is performed, a filter is used for performing low-pass filtering on color information of the $P_s$. The filter is denoted as: H $(A)=\alpha I+\beta A$ I denotes a standard matrix. $\alpha$ and $\beta$ denote an all-pass coefficient and a low-pass coefficient, and $\alpha+\beta=1$ The color information $$P_s^C$$

of the $P_s$ is filtered to obtain a point set denoted as $$\bar{P} = \left[ P_S^G, H(A) P_s^C \right].$$

Similarly, the connection relationship between the points may be applied to the color enhancement, the detail increase and the region enlargement that are brought by the decrease in the viewing distance.

In an embodiment, an embodiment of the present application provides a scheme for performing a quality evaluation of a scale transformation in combination with other attribute information of a point cloud. In addition to the color information, the point cloud further includes other attribute information such as reflectivity, a normal vector and transparency. When the scale transformations in embodiment three to embodiment five are performed, non-color attribute information is combined.

Optionally, color variations in each point, such as color blur and color aliasing, at different viewing distances, different viewing angles, or different viewing points are calculated according to reflectivity.

Optionally, occlusion situations of each point at different viewing distances, different viewing angles, or different viewing points are calculated according to a normal vector.

Optionally, color variations in each point at different viewing distances, different viewing angles, or different viewing points are calculated according to transparency.

Optionally, color variations and occlusion situations at different viewing distances, different viewing angles, or different viewing points are calculated according to reflectivity, a normal vector and transparency.

In an embodiment, the multiple scale transformations in the preceding embodiments may be that a scale transformation is performed on the original reference point cloud region and the original to-be-evaluated point cloud region each time to generate a new reference point cloud region and a new to-be-evaluated point cloud region, and the new reference point cloud region and the new to-be-evaluated point cloud region after each scale transformation are used for calculating a quality evaluation value.

This may also be that a scale transformation is performed on a new reference point cloud region and a new to-be-evaluated point cloud region that have been generated by the last scale transformation to regenerate a transformed new reference point cloud region and a transformed new to-be-evaluated point cloud region, and the new reference point cloud region and the new to-be-evaluated point cloud region after each scale transformation are used for calculating a quality evaluation value.

In an embodiment, a point cloud is considered as a whole in the preceding embodiments, that is, the target number of reference point cloud regions and the to-be-evaluated point cloud regions are considered at the same viewing distance, that is, in a scale transformation, all the reference point cloud regions and all the to-be-evaluated point cloud regions adopt the same scale transformation. However, since the point cloud is present in the three-dimensional space, and regions at different positions have differences in the viewing distance, different regions in the M reference point cloud regions and the corresponding M to-be-evaluated point cloud regions in the preceding embodiments may adopt different scale transformations according to differences in the viewing distance at their positions in a scale transformation. For example, coefficients of different low-pass filters that are used for color blur are calculated and generated according to the differences in the viewing distance, the proportion of the region shrinkage is calculated according to the differences in the viewing distance, and a weight coefficient of each quality evaluation value is set according to the differences in the viewing distance.

In an embodiment, a point cloud is considered as a whole in the preceding embodiments, that is, all the reference point cloud regions and all the to-be-evaluated point cloud regions undergo the same number of times of scale transformations. However, different reference point cloud regions include different details. For example, some regions each include more points, some regions each include fewer points, some regions each have a single color, some regions each have rich colors, some regions each have a slow color variation, and some regions each have a fast color variation. Therefore, different reference point cloud regions and corresponding to-be-evaluated point cloud regions may adopt the different numbers of times of scale transformations. For example, K scale transformations may be performed on a reference point cloud region including more points and a corresponding to-be-evaluated point cloud region, and K−1 scale transformations may be performed on a reference point cloud region including fewer points and a corresponding to-be-evaluated point cloud region.

Figure 7:
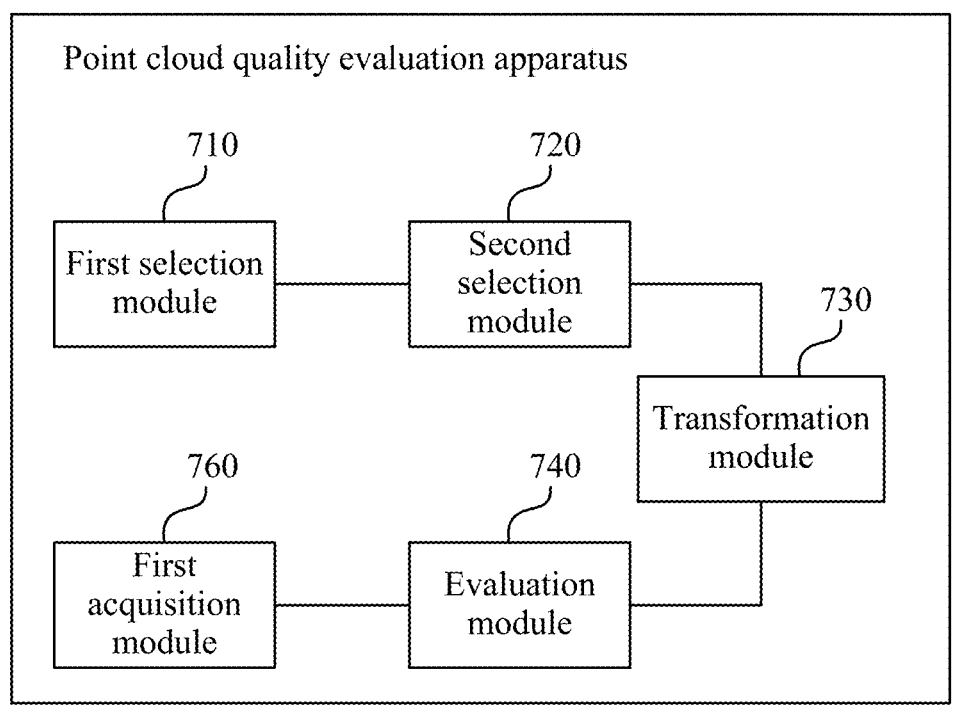
FIG. 7 is a block diagram of a point cloud quality evaluation apparatus according to an embodiment of the present application.

In an embodiment, FIG. 7 is a block diagram of a point cloud quality evaluation apparatus according to an embodiment of the present application. This embodiment may be executed by a terminal device. As shown in FIG. 7, the point cloud quality evaluation apparatus in this embodiment includes a first selection module 710, a second selection module 720, a transformation module 730, an evaluation module 740 and a first determination module 750.

The first selection module 710 is configured to select the target number of reference point cloud regions from a reference point cloud according to a preset region selection rule.

The second selection module 720 is configured to select to-be-evaluated point cloud regions respectively corresponding to the target number of reference point cloud regions from a to-be-evaluated point cloud corresponding to the reference point cloud.

The transformation module 730 is configured to successively perform at least one scale transformation on the reference point cloud region and a respective to-be-evaluated point cloud region to generate corresponding new reference point cloud regions and corresponding new to-be-evaluated point cloud regions.

The evaluation module 740 is configured to separately perform a quality evaluation on each new reference point cloud region and a respective new to-be-evaluated point cloud region to obtain a corresponding quality evaluation value.

The first determination module 750 is configured to fuse all quality evaluation values to obtain a corresponding multi-scale quality evaluation value.

In an embodiment, the first selection module 710 includes a determination unit and a selection unit.

The determination unit is configured to determine the target number of key shapes on the reference point cloud.

The selection unit is configured to select a spatial neighborhood of each key shape as a corresponding reference point cloud region.

In an embodiment, the target number of key shapes is determined in one of the following manners:

The target number of key shapes is selected according to geometry information of the reference point cloud;

the density distribution of points in the reference point cloud is acquired according to the geometry information of the reference point cloud, and the target number of key shapes is selected according to the density distribution;

high-pass filtering is performed on the geometry information of the reference point cloud to obtain the target number of key shapes;

high-pass filtering is performed on color information of the reference point cloud to obtain the target number of key shapes;

the target number of key shapes is obtained according to the geometry information and the color information of the reference point cloud;

the target number of key shapes is obtained according to non-color attribute information of the reference point cloud;

the target number of key shapes is obtained according to the geometry information and the non-color attribute information of the reference point cloud;

the target number of key shapes is obtained according to attribute information of the reference point cloud; or the target number of key shapes is obtained according to the geometry information and the attribute information of the reference point cloud.

In an embodiment, the target number of key shapes includes one of: a key point, a key edge, a key surface, or a key region.

In an embodiment, in response to a viewing distance from a viewer to the reference point cloud increasing, that the at least one scale transformation is performed on the reference point cloud region and the respective to-be-evaluated point cloud region successively to generate the corresponding new reference point cloud regions and the corresponding new to-be-evaluated point cloud regions includes the steps below.

Low-pass filtering, downsampling and region-shrinking are performed on the reference point cloud region successively to generate the corresponding new reference point cloud regions.

Low-pass filtering, downsampling and region-shrinking are performed on the respective to-be-evaluated point cloud region corresponding to the reference point cloud region successively to generate the corresponding new to-be-evaluated point cloud regions.

In an embodiment, in response to a viewing distance from a viewer to the reference point cloud decreasing, that the at least one scale transformation is performed on the reference point cloud region and the respective to-be-evaluated point cloud region successively to generate the corresponding new reference point cloud regions and the corresponding new to-be-evaluated point cloud regions includes the steps below.

Interpolation filtering, upsampling and region enlargement operations are performed on the reference point cloud region successively to generate the corresponding new reference point cloud regions.

Interpolation filtering, upsampling and region enlargement operations are performed on the respective to-be-evaluated point cloud region corresponding to the reference point cloud region successively to generate the corresponding new to-be-evaluated point cloud regions.

In an embodiment, in response to a viewer's viewing angle or viewing point varying when the viewer views the reference point cloud, that the at least one scale transformation is performed on the reference point cloud region and the respective to-be-evaluated point cloud region successively to generate the corresponding new reference point cloud regions and the corresponding new to-be-evaluated point cloud regions includes the steps below.

Low-pass filtering, visibility determination and point position adjustment caused by region deformation are performed on the reference point cloud region successively to generate the corresponding new reference point cloud regions.

Low-pass filtering, visibility determination and point position adjustment caused by region deformation are performed on the respective to-be-evaluated point cloud region corresponding to the reference point cloud region successively to generate the corresponding new to-be-evaluated point cloud regions.

In an embodiment, that the at least one scale transformation is performed on the reference point cloud region and the respective to-be-evaluated point cloud region successively to generate the corresponding new reference point cloud regions and the corresponding new to-be-evaluated point cloud regions further includes the step below.

The at least one scale transformation is performed on the reference point cloud region and the respective to-be-evaluated point cloud region successively according to a predetermined connection relationship between points to generate the corresponding new reference point cloud regions and the corresponding new to-be-evaluated point cloud regions.

In an embodiment, the first determination module 750 is further configured to determine an average value of all the quality evaluation values or an average value of part of all the quality evaluation values as the multi-scale quality evaluation value; or determine a weighted average value of all the quality evaluation values or a weighted average value of part of all the quality evaluation values as the multi-scale quality evaluation value.

In an embodiment, the point cloud quality evaluation apparatus further includes a second determination module.

The second determination module is configured to, before the at least one scale transformation is performed on the reference point cloud region and the respective to-be-evaluated point cloud region successively to generate the corresponding new reference point cloud regions and the corresponding new to-be-evaluated point cloud regions, determine a color variation situation and/or an occlusion situation at different viewing distances or different viewing angles according to the non-color attribute information of the reference point cloud.

In an embodiment, the non-color attribute information includes at least one of: reflectivity, a normal vector, or transparency.

In an embodiment, a reference point cloud region for the at least one scale transformation includes one of: an original reference point cloud region or a latest transformed reference point cloud region.

A to-be-evaluated point cloud region for the at least one scale transformation includes one of: an original to-be-evaluated point cloud region or a latest transformed to-be-evaluated point cloud region.

In an embodiment, in a case where the target number of reference point cloud regions and the corresponding to-be-evaluated point cloud regions are at the same viewing distance, in a scale transformation, all the reference point cloud regions and all the to-be-evaluated point cloud regions adopt the same scale transformation.

In a case where the target number of reference point cloud regions and the corresponding to-be-evaluated point cloud regions are not at the same viewing distance, in a scale transformation, different scale transformations are adopted between all the reference point cloud regions and all the to-be-evaluated point cloud regions.

In an embodiment, the number of times of scale transformations performed on the reference point cloud region and the respective to-be-evaluated point cloud region is related to the number of points included in the regions.

The point cloud quality evaluation apparatus provided in this embodiment is configured to perform the point cloud quality evaluation method in the embodiment shown in FIG. 1. The implementation principle and technical effects of the point cloud quality evaluation apparatus provided in the embodiment are similar and thereby are not repeated herein.

Figure 8:
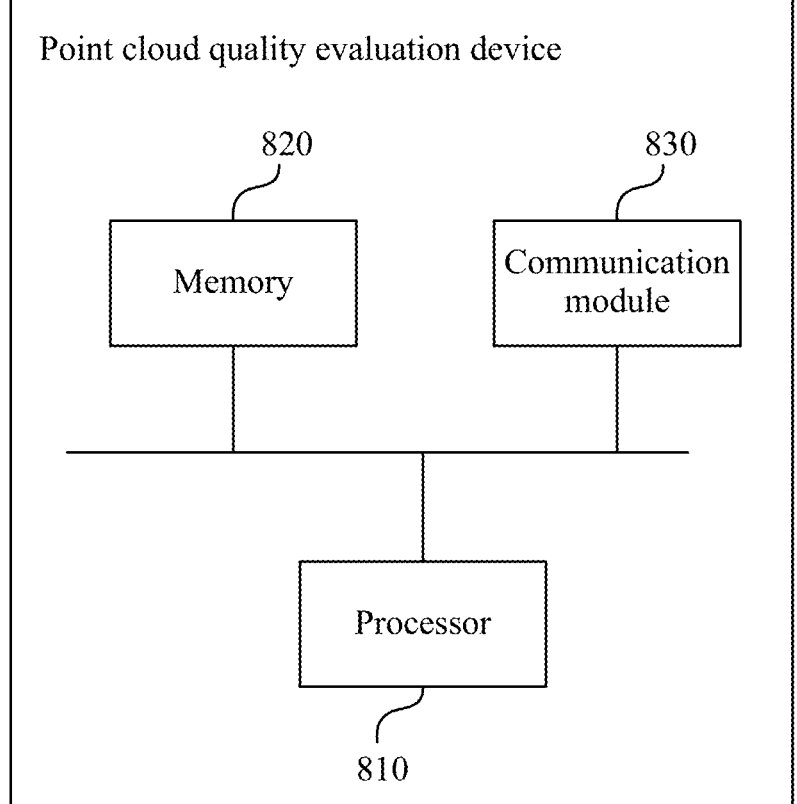
FIG. 8 is a diagram illustrating the structure of a point cloud quality evaluation device according to an embodiment of the present application.

In an embodiment, FIG. 8 is a diagram illustrating the structure of a point cloud quality evaluation device according to an embodiment of the present application. As shown in FIG. 8, the point cloud quality evaluation device provided in the present application includes a processor 810, a memory 820 and a communication module 830. One or more processors 810 may be provided in the point cloud quality evaluation device, with one processor 810 shown as an example in FIG. 8. One or more memories 820 may be provided in the point cloud quality evaluation device, with one memory 820 shown as an example in FIG. 8. The processor 810, the memory 820 and the communication module 830 in the point cloud quality evaluation device may be connected via a bus or in other manners, with connection via the bus as an example in FIG. 8. In the embodiment, the point cloud quality evaluation device may be a terminal device such as a computer.

As a computer-readable storage medium, the memory 820 may be configured to store software programs, computer-executable programs and modules, such as program instructions/modules (for example, the first selection module 710, the second selection module 720, the transformation module 730, the evaluation module 740 and the first determination module 750 in the point cloud quality evaluation device) corresponding to the point cloud quality evaluation device according to any embodiment of the present application. The memory 820 may include a program storage region and a data storage region, where the program storage region may store an operating system and an application program required by at least one function, and the data storage region may store data created depending on the use of the device. Additionally, the memory 820 may include a high-speed random-access memory and may also include a nonvolatile memory, such as at least one magnetic disk memory, a flash memory, or another nonvolatile solid-state memory. In some examples, the memory 820 may further include memories remotely disposed relative to the processor 810, and these remote memories may be connected to the device via a network. Examples of the preceding network include, but are not limited to, the Internet, an intranet, a local area network, a mobile communication network, and a combination thereof.

The communication module 830 is configured to perform communication interaction with another device.

The point cloud quality evaluation device provided in the preceding may be configured to perform the point cloud quality evaluation method provided in any preceding embodiment, and has corresponding functions and effects.

An embodiment of the present application further provides a storage medium including computer-executable instructions which, when executed by a computer processor, are configured to cause the computer process to perform a point cloud quality evaluation method. The method includes: selecting the target number of reference point cloud regions from a reference point cloud according to a preset region selection rule; selecting to-be-evaluated point cloud regions respectively corresponding to the target number of reference point cloud regions from a to-be-evaluated point cloud corresponding to the reference point cloud; successively performing at least one scale transformation on the reference point cloud region and a respective to-be-evaluated point cloud region to generate corresponding new reference point cloud regions and corresponding new to-be-evaluated point cloud regions; separately performing a quality evaluation on each new reference point cloud region and a respective new to-be-evaluated point cloud region to obtain a corresponding quality evaluation value; and fusing all quality evaluation values to obtain a corresponding multi-scale quality evaluation value.

It is to be understood by those skilled in the art that the term "user equipment" encompasses any suitable type of wireless user equipment, for example, a mobile phone, a portable data processing apparatus, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM) or an optical memory device and system (for example, a digital video disc (DVD) or a compact disc (CD)). The computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A point cloud quality evaluation method, comprising:
    selecting a target number of reference point cloud regions from a reference point cloud according to a preset region selection rule;
    selecting to-be-evaluated point cloud regions respectively corresponding to the target number of reference point cloud regions from a to-be-evaluated point cloud corresponding to the reference point cloud;

successively performing at least one scale transformation on each of the target number of reference point cloud regions and a respective one of the to-be-evaluated point cloud regions to generate corresponding new reference point cloud regions and corresponding new to-be-evaluated point cloud regions;

separately performing a quality evaluation on each of the new reference point cloud regions and a respective one of the new to-be-evaluated point cloud regions to obtain a corresponding quality evaluation value; and fusing all quality evaluation values to obtain a corresponding multi-scale quality evaluation value.

2. The method according to claim 1, wherein selecting the target number of reference point cloud regions from the reference point cloud according to the preset region selection rule comprises:

determining the target number of key shapes on the reference point cloud; and selecting a spatial neighborhood of each of the target number of key shapes as a corresponding reference point cloud region.

3. The method according to claim 2, wherein the target number of key shapes is determined in one of the following manners:

selecting the target number of key shapes according to geometry information of the reference point cloud;

acquiring a density distribution of points in the reference point cloud according to geometry information of the reference point cloud, and selecting the target number of key shapes according to the density distribution;

performing high-pass filtering on geometry information of the reference point cloud to obtain the target number of key shapes;

performing high-pass filtering on color information of the reference point cloud to obtain the target number of key shapes;

obtaining the target number of key shapes according to geometry information and color information of the reference point cloud;

obtaining the target number of key shapes according to non-color attribute information of the reference point cloud;

obtaining the target number of key shapes according to geometry information and non-color attribute information of the reference point cloud;

obtaining the target number of key shapes according to attribute information of the reference point cloud; or obtaining the target number of key shapes according to geometry information and attribute information of the reference point cloud.

4. The method according to claim 3, wherein a key shape of the target number of key shapes comprises one of: a key point, a key edge, a key surface, or a key region.

5. The method according to claim 2, wherein a key shape of the target number of key shapes comprises one of: a key point, a key edge, a key surface, or a key region.

6. The method according to claim 1, wherein in response to a viewing distance from a viewer to the reference point cloud increasing, successively performing at least one scale transformation scale transformation on each of the target number of reference point cloud regions and the respective one of the to-be-evaluated point cloud regions to generate the corresponding new reference point cloud regions and the corresponding new to-be-evaluated point cloud regions comprises:

successively performing low-pass filtering, downsampling and region-shrinking on each of the target number of reference point cloud regions to generate the corresponding new reference point cloud regions; and successively performing low-pass filtering, downsampling and region-shrinking on the respective one of the to-be-evaluated point cloud regions corresponding to each of the target number of reference point cloud regions to generate the corresponding new to-be-evaluated point cloud regions.

7. The method according to claim 1, wherein in response to a viewing distance from a viewer to the reference point cloud decreasing, successively performing the at least one scale transformation on each of the target number of reference point cloud regions and the respective one of the to-be-evaluated point cloud regions to generate the corresponding new reference point cloud regions and the corresponding new to-be-evaluated point cloud regions comprises:

successively performing interpolation filtering, upsampling and region enlargement operations on each of the target number of reference point cloud regions to generate the corresponding new reference point cloud regions; and successively performing interpolation filtering, upsampling and region enlargement operations on the respective one of the to-be-evaluated point cloud regions corresponding to each of the target number of reference point cloud regions to generate the corresponding new to-be-evaluated point cloud regions.

8. The method according to claim 1, wherein in response to a viewer's viewing angle or viewing point varying when the viewer views the reference point cloud, successively performing the at least one scale transformation on each of the target number of reference point cloud regions and the respective one of the to-be-evaluated point cloud regions to generate the corresponding new reference point cloud regions and the corresponding new to-be-evaluated point cloud regions comprises:

successively performing low-pass filtering, visibility determination and point position adjustment on each of the target number of reference point cloud regions to generate the corresponding new reference point cloud regions, wherein the point position adjustment is performed for region deformation; and successively performing low-pass filtering, visibility determination and point position adjustment on the respective one of the to-be-evaluated point cloud regions corresponding to each of the target number of reference point cloud regions to generate the corresponding new to-be-evaluated point cloud regions.

9. The method according to claim 1, wherein successively performing the at least one scale transformation on each of the target number of reference point cloud regions and the respective one of the to-be-evaluated point cloud regions to generate the corresponding new reference point cloud regions and the corresponding new to-be-evaluated point cloud regions comprises:

successively performing the at least one scale transformation on each of the target number of reference point cloud regions and the respective one of the to-be-evaluated point cloud regions according to a predetermined connection relationship between points to generate the corresponding new reference point cloud regions and the corresponding new to-be-evaluated point cloud regions.

10. The method according to claim 1, wherein fusing all the quality evaluation values to obtain the corresponding multi-scale quality evaluation value comprises:

determining an average value of all the quality evaluation values or an average value of part of all the quality evaluation values as the multi-scale quality evaluation value; or determining a weighted average value of all the quality evaluation values or a weighted average value of part of all the quality evaluation values as the multi-scale quality evaluation value.

11. The method according to claim 1, before successively performing the at least one scale transformation on each of the target number of reference point cloud regions and the respective one of the to-be-evaluated point cloud regions to generate the corresponding new reference point cloud regions and the corresponding new to-be-evaluated point cloud regions, the method further comprising:

determining at least one of a color variation situation or an occlusion situation at different viewing distances or different viewing angles according to non-color attribute information of the reference point cloud.

12. The method according to claim 11, wherein the non-color attribute information comprises at least one of: reflectivity, a normal vector, or transparency.

13. The method according to claim 1, wherein a reference point cloud region for the at least one scale transformation comprises one of: an original reference point cloud region or a latest transformed reference point cloud region; and a to-be-evaluated point cloud region for the at least one scale transformation comprises one of: an original to-be-evaluated point cloud region or a latest transformed to-be-evaluated point cloud region.

14. The method according to claim 1, wherein in a case where all the target number of reference point cloud regions and the corresponding to-be-evaluated point cloud regions are at a same viewing distance, in one of the at least one scale transformation, all the target number of reference point cloud regions and all the corresponding to-be-evaluated point cloud regions adopt a same scale transformation; and in a case where different reference point cloud regions and corresponding to-be-evaluated point cloud regions are not at a same viewing distance, in one of the at least one scale transformation, different scale transformations are used between the different reference point cloud regions and the corresponding to-be-evaluated point cloud regions.

15. The method according to claim 1, wherein the number of times of scale transformations performed on each of the target number of reference point cloud regions and the respective one of the to-be-evaluated point cloud regions is related to the number of points comprised in the regions.

16. A point cloud quality evaluation device, comprising a communication module, a memory and at least one processor; wherein the communication module is configured to perform communication interaction with another device;

the memory is configured to store at least one program; and when executed by the at least one processor, the at least one program causes the at least one processor to perform the method according to claim 1.

17. A non-transitory storage medium storing a computer program which, when executed by a processor, causes the processor to perform the method according to claim 1.

* * * * *